Oct. 28, 1952    H. G. BECK    2,615,212
WEATHER STRIP AND REFRIGERATOR GASKET
Filed Aug. 31, 1950    2 SHEETS—SHEET 2
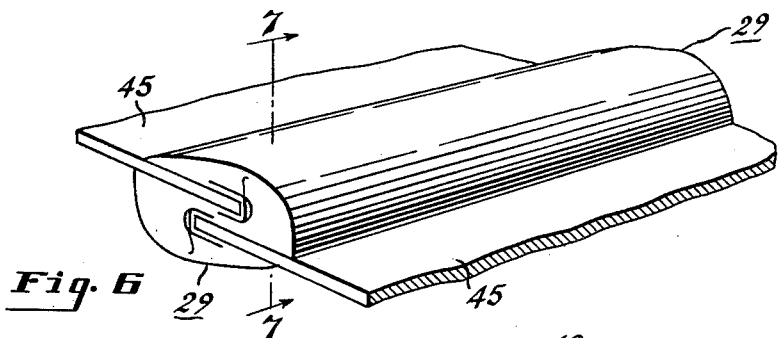
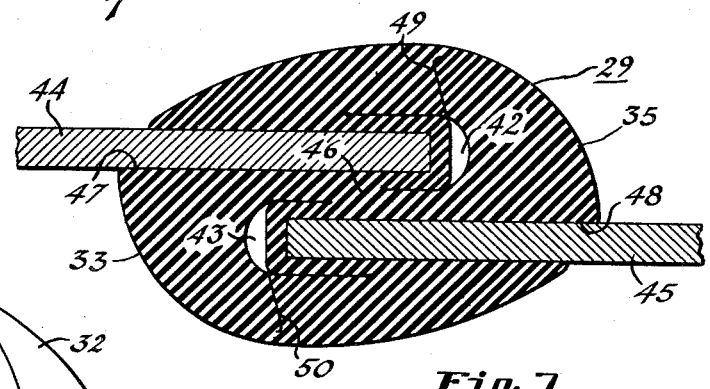
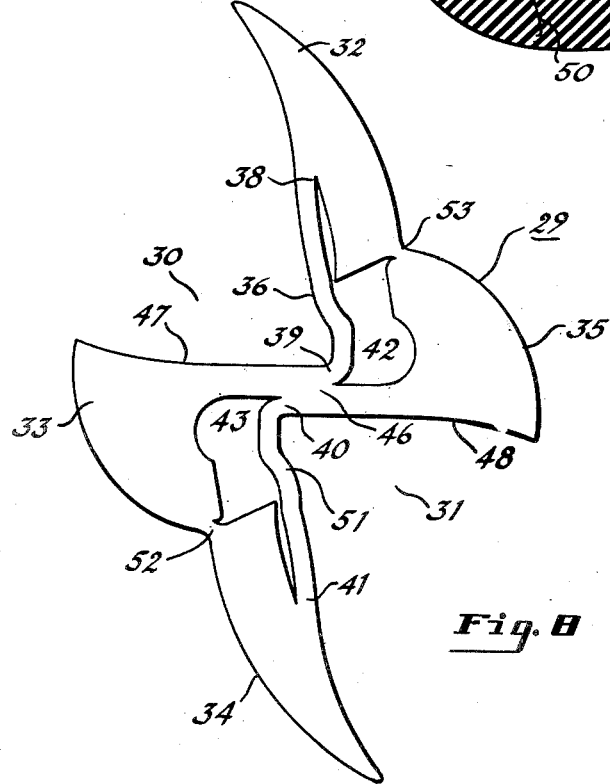
INVENTOR
Howard G. Beck
BY Evans & McCoy
ATTORNEYS

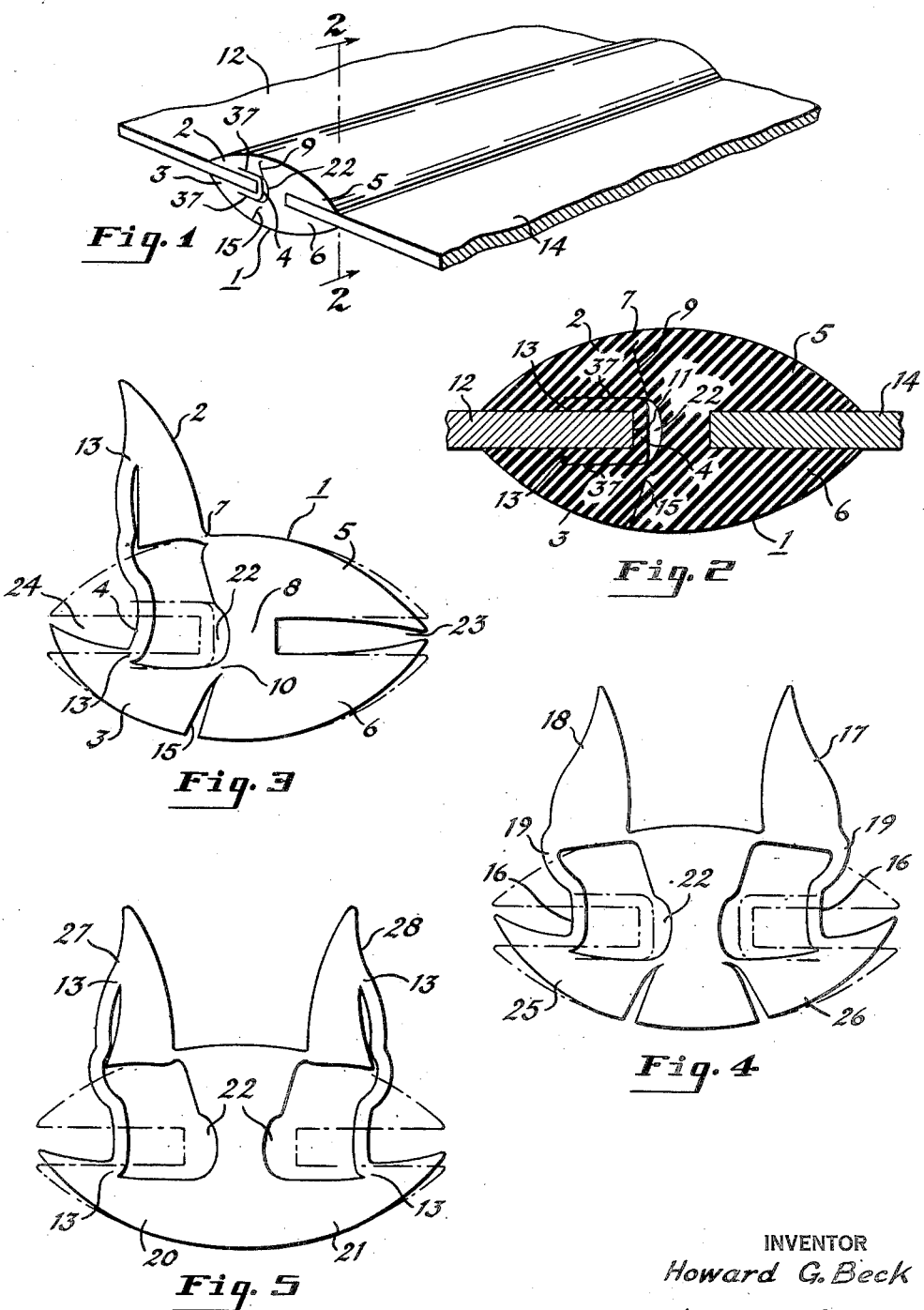

UNITED STATES PATENT OFFICE 2,615,212

WEATHER STRIP AND REFRIGERATOR GASKET

Howard G. Beck, Wabash, Ind., assignor to The General Tire and Rubber Company, Akron, Ohio, a corporation of Ohio Application August 31, 1950, Serial No. 182,448

7 Claims. (Cl. 20—56.4)

This invention relates to a linear rubber seal or gasket for joining together adjacent panel edges. It is particularly directed toward joining adjacent panel edges of utilitarian articles, such as kitchen cabinets, deep freeze units and refrigerators.

Panel edges are often joined together by a linear rubber seal or mounting having opposed channels or grooves for receiving the panels and means by which to expand the mounting body to cause it to grip and hold the panel edges. This means usually consists of a linear plug or spreader which is pushed into a longitudinal groove intermediate the channels to force the body flanges against the panel.

The object of the present invention is to provide a seal or gasket which is self-sealing or self-gripping. In other words, it is the object of the present invention to provide a gasket which does not require separate sealing elements, such as a linear plug or spreader.

Another object of the present invention is to minimize expense and complication in the assembly of panel edges, such as refrigerator doors and the like, and to reduce the number of assembly steps.

Still another object of the present invention is to provide a simple and inexpensive panel assemblying gasket or mounting.

Other objects and advantages will become apparent upon examination of the accompanying drawings in which like parts are denoted by like numerals.

Figure 1 is a perspective view of the gasket of the present invention joining two panel edges as in a cabinet or refrigerator.

Fig. 2 is a cross-sectional view taken along line 2—2 showing the panel edges as assembled with the gasket.

Fig. 3 is a view of the gasket in its unassembled or natural form.

Fig. 4 is a view of one modified form of gasket of the present invention in its natural form. This gasket has clamping jaws on both sides and the upper or opening jaw does not have a slit in it from the base outward along the inner side wall.

Fig. 5 is a view of a second modified form of the gasket of the present invention. This gasket has no slit from the gasket surface in toward the jaw base.

Fig. 6 is a perspective view of a modified form of gasket as assembled with two panel edges such as a refrigerator. This modification has two parallel, offset channels.

Fig. 7 is a cross-sectional view taken along line 7—7 showing how the panel edges join with the gasket.

Fig. 8 is an end view of the gasket of this modification in the natural unassembled form.

The gaskets or mountings of the present invention are characterized by a linear body of rubber-like material with opposing grooves therein to receive panel edges, at least one groove of which is formed by a pair of clamping jaws which clamp upon the panel edge as it is pushed or shoved into them and which grip and hold the panel tightly. The opposing grooves, or spaced, outwardly facing linear channels, are generally coplanar when the mounting is assembled.

Thus the gasket or mounting 1 comprises opposing grooves 23 and 24 with groove 24 formed by surface pivoted, opening jaw 2, and base or stable jaw 3. Groove 23 is formed by upper jaw 5 and lower jaw 6. Transverse or connecting web 4 joins the base of opening jaw 2 and stable jaw or base pivoted flange 3. The jaws are all integrally connected to the mounting body through the center section 8, as shown. The gasket is extruded in linear strips of flexible or rubber-like material and jaw 2 is open (as shown in Fig. 3) in the natural or unassembled state.

The opening jaw or edge clamping flange 2 is connected to the mounting body along pivot line or hinge 7 which is preferably disposed at or near the outer surface of the mounting body as shown. This jaw is hinged to the body of the mounting and is cut or severed from the base or mounting center 8 out to the hinge 7 to form cut 9. The jaw is extruded or formed in the open position of Fig. 3 and the hinge 7 and cut 9 permit it to close up and clamp upon panel edges without distortion or compression of the mounting body proper or adjacent jaw 5. The base jaw 3 preferably pivots from the mounting base in the same direction as jaw 2 and preferably has a slit or cut in from the surface towards the base 8. This jaw in its preferred form, as illustrated in Figs. 1 to 4 inclusive, is hinged along the base or center hinge 10, and in the natural or unassembled position is roughly parallel to the plane of the panel 12 and actually pivots only slightly. For this reason it is called the stable jaw or flange. The cut 15 eliminates any possible tensile stress on the outer surface of the mounting when assembled which would tend to open the adjacent jaw 6.

The pair of self-clamping jaws 2 and 3 of Fig. 3 are characterized by a base connecting web 4, each of the opposite side edges of which are integral with or connect one of the jaws along lines thru points 13 which are a substantial distance out from and preferably about one-half way out from the mounting base 8 on the jaws themselves. The web 4 is preferably integral with the mounting only along its side edges which intersect the inner surface regions of the opposed jaws as shown. When assembled as in Fig. 2, this base web appears to be separated from the jaws by two parallel slits of cuts 37 at either side of it in the plane of the panel 12. The width of the web, that is the distance between the intersections with the side edges, is substantially greater than the width of the channel base or the distance between the jaws when in a parallel condition. In this way, when the jaws are parallel, as when assembled with a panel edge, the web is substantially U-shaped. When the panel edge 11 is forced in against the web 4 and pushes against it to put it in tension, the web pulls in on the jaws at points 13 to cause them to grip the left-hand panel 12 firmly. The cuts 37 permit the web to be tensioned without distortion of the adjacent jaws and this tensile force acts on the jaws at the web juncture point only. Thus the jaws are closed by merely forcing the panel edge into the mounting, and the jaws are therefore self-sealing or self-clamping. The degree of clamping at the ends can be varied by the location of the intersections 13, greater tip clamping usually being obtained when the intersection is nearer the tips of the jaws, and less clamping being obtained when nearer the base portion.

A desirable feature of the present invention is a longitudinal hollow or groove 22 centrally located or inward from the web or tension member 4, or intermediate the groove end portion of the base web and mounting body. This hollow is formed by the mounting center 8 and web 4 and allows the panel edge limited inward leeway or motion so that it can be pushed in as necessary to tension web 4 and clamp the flanges 2 and 3 about it.

The opposite or right-hand panel 14 fits into the jaws 5 and 6 as shown in Fig. 2. In practice, this panel is placed in these jaws first and then the second panel 12 placed in the self-sealing jaws 2 and 3. Both panels are in the same plane.

All the jaws or flanges of this invention have a concave or inwardly curving gripping edge so that the clamping and gripping forces on the panel are evenly distributed and are not concentrated at the base area.

Fig. 4 shows a modified mounting in which both panel receiving sides of the mounting have clamping jaws 17, 18, 25, and 26, similar to the pair 2 and 3 of Figs. 2 and 3. The opening or surface pivoting jaws are further distinguished in that the base web or tension member 16 joins the jaws 17 and 18 at a central or inner point 19 on the jaw base, and thus eliminates the parallel cut or slit 10 of Fig. 1. This slit can be omitted or not, depending on the seal desired.

Fig. 5 shows an additional modification. The surface pivoted opening jaws 27 and 28 are similar to opening jaw 2 of Figs. 2 and 3. This mounting has no cut on the base pivoted jaws 20 and 21 inward from the surface to the base similar to cut 15 of Figs. 2 and 3. This also shows that a mounting can have either one (Fig. 3) or two (Fig. 5) sets of sealing jaws as desired.

Still another modification of the mounting of the present invention is shown in Figs. 6, 7, and 8. Here the mounting 29 is characterized by opposing grooves or channels 30 and 31 which are parallel to each other but offset and overlapping as shown. Groove or channel 30 is formed by opening or surface pivoted jaw or flange 32 and edge 47 of base flange or body portion 33, and groove or channel 31 is formed by opening or surface pivoted jaw 34 and edge 48 of base flange or body portion 35.

Jaw 32 has a base cut or slice 49, and jaw 34 has a cut 50 at the base thereof, extending from the hollows 42 and 43 respectively almost to the mounting surface. This forms surface pivots or hinges 53 and 52.

Thus a plane through the mounting center parallel to the planes of the grooves bisects the mounting so that jaw 32 of groove 30 and base flange or body portion 35 of groove 31 are on one side of the plane, and jaw 34 and base flange 33 are on the other side of the plane. The base flanges or body portion correspond to the base jaws or stable flange 3 of Fig. 3.

The grooves are offset by the center portion 46 of the mounting and they overlap by the distance between the hollows 42 and 43. Tension web or diaphragm 36 connects across the base of groove 30 from point 38 on jaw 32 to point 39 at the mounting center. Likewise, tension web or diaphragm 51 connects across the base of groove 31 from point 41 on jaw 34 to point 40 at the mounting center. Intermediate web 36 and the body portion 35 and formed by the same is longitudinal bore or hollow 42, and intermediate web 51 and body portion 33 and formed by the same is hollow 43.

The mounting cross-section, when assembled, is generally oval, as shown in Fig. 7. The panel 44 fits into groove 30 to place the diaphragm 36 in tension and clamp jaw down upon it and at the same time push body portion 35 down upon the opposite panel 45. Likewise, panel 45 fits into groove 30 to tension the diaphragm 51 and clamp jaw 34 upon panel 45 and also push body portion 33 against panel 44. The adjacent body portion also clamps upon the panel. Thus the portion of edge 48 of body portion 35 near web junction point 40 clamps upon panel 45 and the portion of edge 47 of body 33 near web junction point 39 clamps and grips panel 44. From this it can be seen that the clamping action upon each panel is cooperative with the action upon the other panel, and that each panel is firmly held by this mounting or seal.

The mountings and seals disclosed herein are primarily for use on utility, mass produced objects, such as cabinets, refrigerators, and deep freeze units, but they of course can be used wherever adjacent panel edges need to be joined.

Only preferred embodiments of this invention have been shown and illustrated. Additional embodiments may be made within the scope of this invention, as provided by the patent statutes.

What I claim is:

1. A mounting of flexible material for joining adjacent panel edges comprising a pair of spaced opposite grooves, at least one groove of which is formed by a pivoted, opening jaw and a base jaw with a tension web across the base central portion thereof connecting to said jaws at points out from the base thereof with a longitudinal hollow intermediate the tension web and mounting body, said pivoted jaw being pivoted about a line longitudinal of the mounting spaced from the panel contacting face of said jaw whereby tension on said web causes increased pressure at the tip region of said jaw.

2. A mounting for joining adjacent panel edges comprising a pair of spaced opposite grooves at least one of which is formed by one flange open in the natural position and hinged to the mounting surface about a line spaced from the panel contacting surface of said jaw and a second flange hinged toward the central portion of the mounting body, said flanges being connected in an intermediate region out from the base and hinges thereof along their inner surface to a tension diaphragm, and said mounting body having a central longitudinal hollow intermediate the tension diaphragm and center of the mounting body.

3. A gasket for joining adjacent panel edges having two opposite outwardly facing linear channels, each channel formed by a pair of self-sealing jaws comprising one jaw open in the natural position and hingedly pivoted along the mounting surface about a line spaced from the plane of the panel contacting face thereof and with a cut extending inward from this pivot to the channel base, and a second jaw hingedly pivoted along the channel base with a cut outward from this pivot to the mounting surface, a web joining the jaws at points approximately half-way along the inner surfaces thereof, and a longitudinal hollow intermediate the web and central gasket portion, said jaws functioning so that as a panel edge is pushed into them they clamp upon and grip it.

4. A gasket of flexible material for joining adjacent panel edges, said gasket having opposite outwardly facing linear channels each channel formed by a pair of self-sealing jaws, one jaw of each pair being open in its natural position and being hingedly pivoted along the mounting surface about a line longitudinal of the mounting spaced from the plane of the panel contacting face of said jaw, and a second jaw substantially rigid with the channel base, a web joining the jaws together at points intermediate the faces of said jaws and a longitudinal hollow intermediate the web and central gasket portion, said jaws functioning so that as the panel edge is pushed into them they clamp upon it and grip it.

5. A gasket of flexible material for joining adjacent panel edges, said gasket having opposite outwardly facing linear channels, each channel formed by a pair of self-sealing jaws, one jaw of each pair being open in its natural position and being hingedly pivoted along the mounting surface and about a line longitudinal of the mounting spaced from the plane of the panel contacting face of said jaw and a second jaw substantially rigid with the channel base, a web joining one of said jaws of each groove adjacent the base portion thereof with the other of said jaws of the same groove at an intermediate portion thereof and central gasket portion connecting together the jaws forming the side walls of each of the opposing grooves, said jaws functioning so that as the panel edge is pushed into them they clamp upon the gripper.

6. A mounting of flexible rubberlike material for joining adjacent panel edges comprising a pair of spaced, opposite grooves, at least one of which is formed by a flange having a panel contacting surface hinged to the mounting surface about a longitudinal line spaced from the plane of the panel contacting surface and a base flange integral with the mounting body and also having a panel contacting surface and a tension diaphragm connecting across the base portion of said groove and a longitudinal hollow intermediate said diaphragm and mounting center.

7. A mounting of flexible rubberlike material for joining adjacent panel edges comprising spaced, opposite channels overlapping and offset from one another, each channel being formed by a surface pivoting jaw having a panel contacting surface and pivotal about a line spaced from the plane of said panel contacting surface and outwardly of the mounting center and parallel therewith, said jaw being in the natural position, and a base flange, a tension web connecting across the base portion of the channel from the jaw to the base flange, and with a longitudinal hollow intermediate the web and base flange of the opposite channel.

HOWARD G. BECK.

REFERENCES CITED

The following references are of record in the file of this patent:

UNITED STATES PATENTS

| Number | Name | Date |
|---|---|---|
| 1,751,786 | Best | Mar. 25, 1930 |
| 2,206,717 | Dodge | July 2, 1940 |
| 2,430,873 | Haas | Nov. 18, 1947 |
| 2,505,893 | Haas | May 2, 1950 |